Patented May 3, 1949

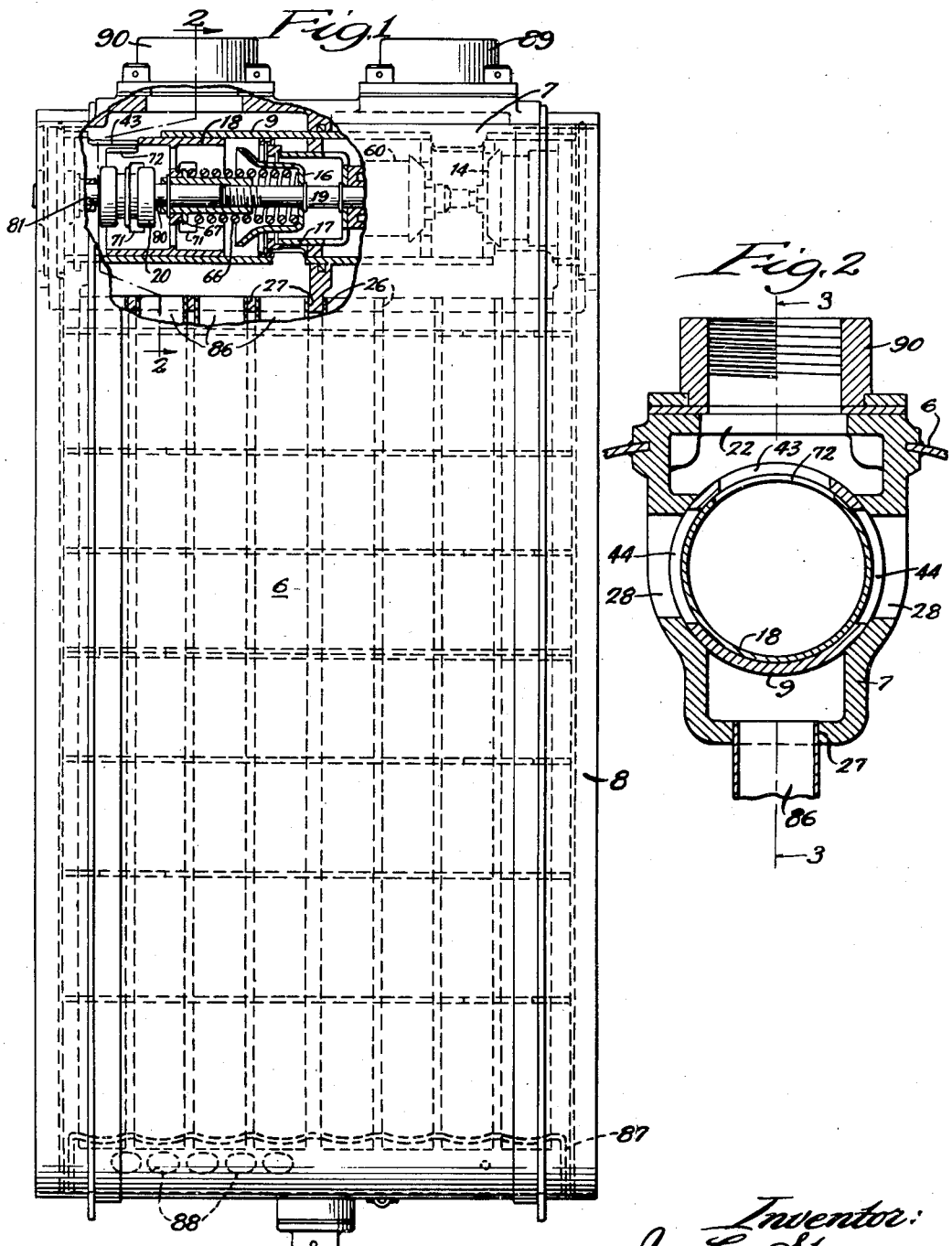

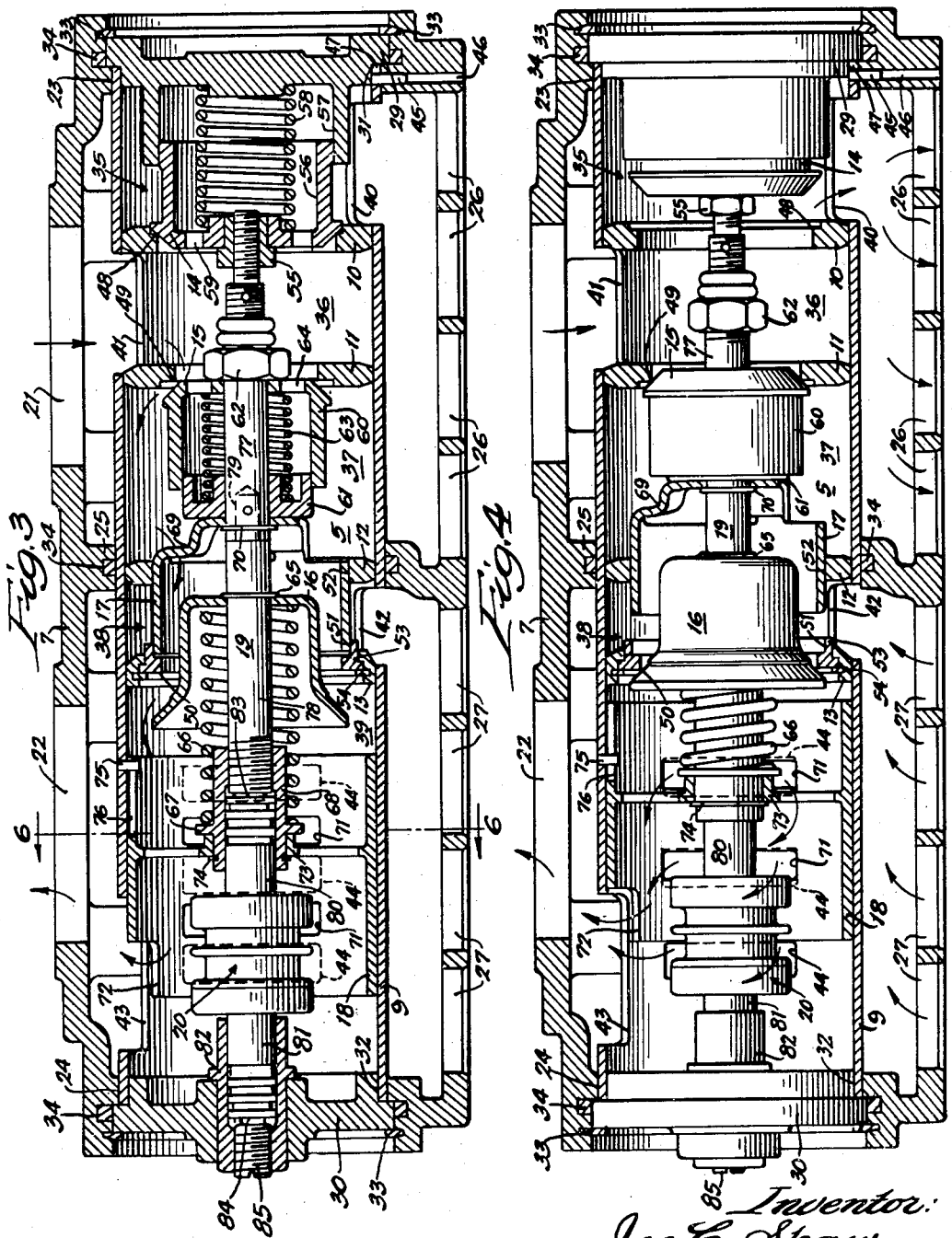

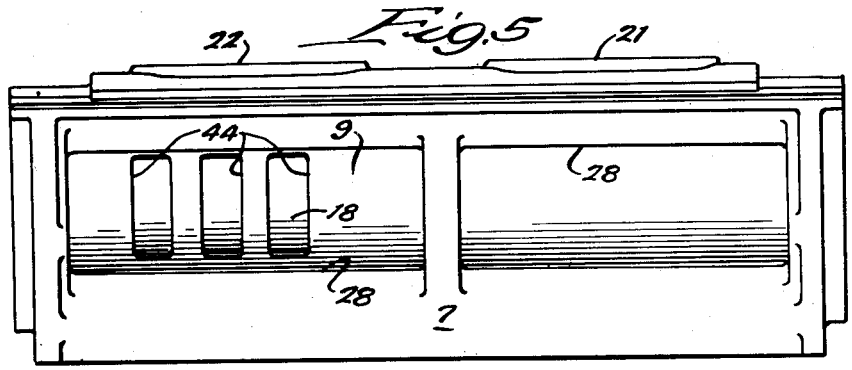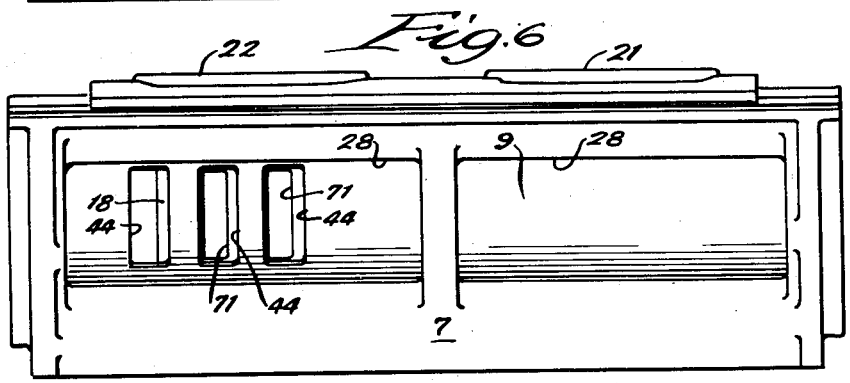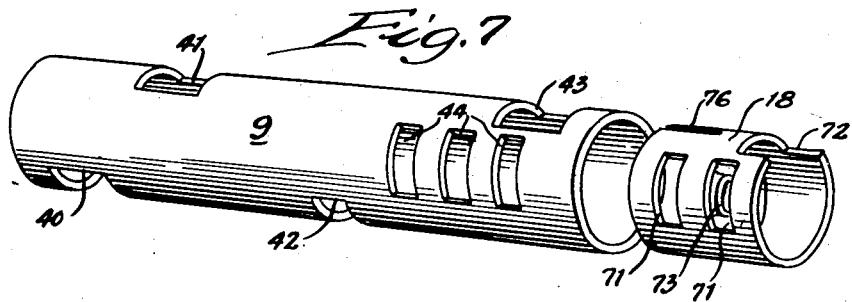

2,469,212

UNITED STATES PATENT OFFICE 2,469,212

TEMPERATURE-REGULATING VALVE MECHANISM FOR HEAT-EXCHANGE DEVICES

Joe C. Shaw, Racine, Wis., assignor to Young Radiator Company, Racine, Wis., a corporation of Wisconsin Application December 4, 1946, Serial No. 713,966

4 Claims. (Cl. 236—34)

Modern aircraft, being used in all kinds of extreme hot and cold weather conditions, requires cooling units for the power plant lubricating oil equipped with a special type valve mechanism. This mechanism must be so constructed and thermostatically actuated that during the operational demands upon the cooler, which at times cause quick changes in the viscous condition of the oil, it will protect the oil cooler against its being subjected to pressures likely to cause injury to the core structure, depended upon for the dissipation of heat from the oil during the normal operation of the aircraft power plants. To this end oil coolers for modern aircraft have been provided with thermostatically - actuated valve mechanisms which cause the oil flow to either (1) by-pass the cooling core and travel through an unrestricted warming chamber when because of the congealed condition of the oil in the core labyrinth an attempt to force oil through said labyrinth would most likely result in injury to the walls, or (2) by-pass both the warm-up chamber and the core labyrinth when pressure on the congealed oil in the warm-up chamber as well as in the core labyrinth might cause injury to the walls of the warm-up chamber.

In order to fully safeguard the warm-up chamber and the core labyrinth from excessive pressure, the main valve mechanism for controlling such three-fold oil flow has to be supplemented by check valves situated so as to preclude the possibility of a back pressure reaching the warm-up chamber or the core labyrinth when the main valve mechanism has been actuated to by-pass the oil flow around these oil cooler channels.

The main objects of this invention, therefore, are to provide an improved form of thermostatically-actuated valve mechanism for oil cooling units for aircraft power plants whereby the oil cooler is always protected against excessive pressures; to provide an improved auxiliary valve mechanism, which protects the oil cooling unit from back pressure of the oil when the main valve mechanism has been actuated to effect a by-pass of the cooling unit dual flow paths; and to provide an improved auxiliary valve mechanism of this kind actuated by the same thermostatic means which actuates the main valve mechanism so that the functioning of the auxiliary valves is synchronized with the operation of the valve mechanism which controls the flow paths for the oil.

A preferred form of valve mechanism, embodying this invention, is shown in the accompanying drawings, wherein:

Fig. 1 is a side elevation of an aircraft oil cooling device equipped with a valve mechanism embodying this invention;

Fig. 2 is an enlarged cross-sectional detail taken on the line 2—2 of Fig. 1 showing the manner in which the valve housing is suspended within and bonded to the oil cooler casing;

Fig. 3 is a longitudinal sectional view of the valve mechanism taken on the line 3—3 of Fig. 2, the valves being positioned to permit an oil flow through the valve housing to by-pass the oil cooler completely;

Fig. 4 is a similar view but with the valves shifted to the opposite extreme of their positions which permits the flow of oil through the main cooling core of the oil cooler;

Fig. 5 is a side elevation of the valve housing showing closed the ports through which the oil from the main oil cooling core enters the outlet end-chamber in the valve sleeve housing;

Fig. 6 is a similar view showing these ports partially open to permit oil flow therethrough; and Fig. 7 is a perspective view of the improved sleeve mounting for valve mechanisms of this kind, one of the auxiliary valves associatable therewith being shown in its disassembled axial position.

The preferred form of auxiliary valve mechanism embodying this invention, is herein shown incorporated in a valve mechanism of the type set forth in co-pending application Serial No. 713,965, filed December 4, 1946. Such a valve mechanism is designed for use with an oil cooling device 6 of the type shown in Shaw-Schlapman co-pending application Serial No. 508,104, filed October 29, 1943, the housing 7 for the valve mechanism being constructed so as to be suspended from and within the casing 8 of the oil cooling device, as more clearly set forth in co-pending application Serial No. 713,- 964, filed December 4, 1946.

The valve mechanism 5 comprises the housing 7 wherein is supported a sleeve 9 which mounts a plurality of valve seat partitions 10, 11, 12, and 13 with which co-act the primary main valve members 14, 15, and 16 and the auxiliary valve members 17 and 18, arranged on a valve stem 19, so as to be actuated by the thermostat 20 for controlling the flow of oil from the housing main inlet port 21 to the housing main outlet port 22 either directly through the housing or indirectly through one or the other of the dual oil-flow paths in the oil cooling device 6.

An oil cooling device 6 of the type set forth in the aforesaid co-pending application Serial No. 508,104 includes a row of spaced tubes extending diametrically across the casing in a plane disposed axially of the casing and a battery of tubes extending axially of the casing 8 and filling the spaces on the opposite sides of these tubes and between them and the casing 8. These latter tubes have their ends bonded together and to the periphery of the casing 8 so as to form a labyrinth around said tubes in heat-exchange relationship with a cooling medium flowing through said tubes. These two sets of tubes provide two oil flow paths through the cooling device, one through the diametrically arranged tubes, which is commonly referred to as the "warm-up chamber," and the other through the labyrinth around the axially-disposed tubes, which is referred to as the main cooling core.

The main housing 7, for the valve mechanism, is in the form of a casting the open ends of which have formed thereon annular ribs 23 and 24 and an intermediate annular rib 25 which co-act to provide support for the sleeve 9. In addition to the main inlet and outlet ports 21 and 22, located in the top wall of the housing 7, the housing is provided with an auxiliary outlet port 26 and an auxiliary inlet port 27 formed in the bottom of the housing, and a pair of auxiliary inlet ports 28 formed in the side walls of the housing. As will be noted from Fig. 2, the side walls of the housing 7, whereat the inlet ports 28 are formed, extend inwardly to constitute further support for the sleeve 9, in addition to that afforded by the ribs 23, 24, and 25. Moreover, such formation of the housing walls restricts communication between these several housing ports and the ports which are formed in the sleeve 9, as will appear more fully hereinafter.

End caps or plates 29 and 30 are provided for closing the open ends of the housing. These end caps have annular shoulders 31 and 32 formed on the inner faces thereof which telescope and fit within the adjacent ends of the sleeve 9. Such end caps 29 and 30 are held in place by a conventional type of spring ring 33. Gaskets 34 are recessed in the housing 9 outwardly of the ribs 23 and 24 and in the rib 25 so as to form an oil-tight seal between the housing 7 and the end caps 29 and 30 and the sleeve 9.

The sleeve 9, as most clearly shown in Fig. 3, is a tubular member of a length so that it will fit within the housing 7 between the end caps 29 and 30, being supported on the ribs 23, 24, and 25. Within this sleeve are secured the valve-seat partitions 10, 11, 12, and 13 which divide the interior of the sleeve into chambers 35, 36, 37, 38, and 39. Ports 40, 41, 42, 43, and 44 are formed in the sleeve 9 so as to provide communication respectively between the chamber 35 and the housing auxiliary outlet port 26, the chamber 36 and the housing main inlet port 21, the chamber 38 and the housing auxiliary inlet port 27, the chamber 38 and the housing main outlet port 22, and the chamber 39 and the housing auxiliary inlet ports 28, as may be controlled by the operation of the valve mechanism, to be explained more fully hereinafter.

The sleeve 9 is located and held in its proper angular position with respect to the housing 7 by means of a pin 45. This pin is inserted through an aperture 46 in the housing 7 adjacent the end cap 29 and engages a recess 47 in the end of the sleeve 9.

The valve-seat partitions 10, 11, 12, and 13 are in the form of annular members brazed or welded on the interior of the sleeve 9. They are provided with central openings which afford communication between the adjacent chambers and permit the formation of valve seats 48, 49, 50, 51, and 52 adapted to co-act with the valve members 14, 15, 16, and 17, respectively, in the control of such inter-chamber communication.

It will be noted from Fig. 3 that the valve seats 50 and 51 are formed on a separate ring 53 mounted on the valve-seat partition 13 and held in place by a conventional type spring ring 54.

The primary or main valve members 14, 15, and 16 are of the poppet type whereas the auxiliary valve members 17 and 18 are of the sleeve type.

The slide or valve member 14 is supported on a bushing 55 threaded on the end of the valve stem 19. On the side opposite the tapered part, which engages the valve seat 48, is formed an annular extension 56 which serves as a piston slidably mounted in a cylinder 57 integrally formed on the end cap 29. A spring 58 is interposed between the valve member 14 and the end cap 29 and normally urges the valve member 14 toward its seat 48. Apertures 59 are formed in the valve member 14 to provide communication between the chamber 36 and the cylinder 57 rearwardly of the valve member 14.

The valve member 15 is of a construction quite similar to the valve member 14 except that the extension 60 serves as a cylinder co-acting with a piston 61. The valve member 15 is slidably mounted on the valve stem 19 inwardly of a nut 62 on said stem and is normally urged against said nut by means of a spring 63 interposed between the valve member 15 and the piston 61. Apertures 64 are formed in the valve member 15 which permit communication between the chamber 36 and the cylinder 60 rearwardly of the valve member 15.

The diameter of the opening through the valve seat partition 10 is equal to the interior diameter of the piston cylinder 57 whereas the diameter of the opening of the valve-seat partition 11 is slightly greater than the interior diameter of the cylinder 60. This establishes a condition of balance for the valve member 14 and a condition of imbalance for the valve member 15. Accordingly, the movement of the valve member 14 will be confined to the pressure differential between the spring 58 and the action of the thermostat 20 under the changing temperature of the oil flowing through chamber 36. On the other hand, the valve member 15, due to a differential in the force of the oil pressure acting on opposite sides of the valve when the valve member 15 is seated under the pressure of the thermostat 20, will retract against the action of the spring 63 to subsequent increasing oil pressure in the chamber 36.

The valve member 16 is bell-shaped and slidably mounted on the valve stem 19, being normally urged into contact with a shoulder 65 on said stem by means of a spring 66 interposed between valve member 16 and a flange 67 on a collar 68 threadingly connected on the valve stem 19.

The auxiliary valve member 17 is slidably supported on the valve seats 51 and 52 to span the port 42 and is connected to the valve stem 19 by means of a spider 69. The hub of the spider embraces the valve stem 19 and the valve is normally urged against shoulder 70 on the valve stem 19, by means of the spring 63. Hence the valve 17 is moved by the stem 19 synchronically with the vales 14, 15, and 16.

The auxiliary valve 18 is slidably mounted in the sleeve 9 within the chamber 39. It is provided with ports 71 adapted to register with the ports 44 in the sleeve 9 and is recessed at 72 to provide an opening registering with the port 43 in the sleeve 9. This valve member is mounted on the collar 68 by means of a spider 73, the hub of which is held firmly against the flange 67 by means of a spring ring 74. An inwardly-extending pin 75, supported on the housing 9, is received in a slot 76 in the auxiliary valve member 18 so as to locate and retain the valve member 18 in its proper angular position with respect to the sleeve 9. As with the auxiliary valve 17, the auxiliary valve 18 is moved by the stem 19 synchronically with the valves 14, 15, and 16.

These two auxiliary slide valves are provided to effect a cutting off of any possibility of a back pressure from the chambers 38 and 39 into the oil cooler when the main valves 14, 15, and 16 have been shifted by the thermostat to close the inlet flow to the chamber 35 and cause a direct flow axially through the housing 7 from the housing inlet port 21 to the housing outlet port 22, thus by-passing the oil cooler 6.

The valve stem 19 is made up of two sections 77 and 78. These are secured together by a slip fit as shown at 79, so that in its assembled form it constitutes a unitary part extending from the chamber 35, where it supports the valve member 14, to the chamber 39, where it is supported in axial alinement with the thermostat 20.

The thermostat 20 is of the Vernet type and comprises two of these devices opposed to each other. The stem 80 for the one thermostat extends into the collar 68 whereas the stem 81 on the other thermostat is received in a collar 82 supported on the housing end cap 30. The pins 83 and 84 for these respective thermostat elements, which are shifted relative to the stems 80 and 81 by reason of the temperature influence on the expansible substance therein, bear respectively against the end of the valve stem section 78 and a plug 85 threaded into the end of the collar 82.

A valve mechanism of this type is especially suited for assembly with an oil cooling device 6 of the type shown in aforesaid co-pending application Serial No. 508,104, in the preferred relationship as more fully set forth in the aforesaid co-pending application Serial No. 713,964. In such an arrangement the valve housing 7 is suspended within the casing 8 of the oil cooling device 6. The casing is bonded to the housing as shown in Fig. 2 so that only the top wall of the valve housing 7, with its main inlet and outlet ports 21 and 22, is exterior of the casing 8. The upper ends of the warm-up chamber tubes 86 fit into the bottom of the housing 7 in communication with the respective housing auxiliary outlet and inlet ports 26 and 27. At their opposite ends these tubes are connected with a header 87 wherein are formed port openings 88 which provide communication with the main core sections surrounding the usual axially-disposed tubes filling the compartments between the tubes 86 and the casing 8.

Such a sleeve mounting for the valve mechanism, as herein set forth, lessens the amount of machining that has to be done on the housing 7. This is particularly advantageous where the valve mechanism is to be suspended within the cooler casing 8, as herein shown and described. This permits the highly machined and delicately arranged valve mechanism to be assembled in the valve housing 7 after all the work has been done to install and seal the various tubes which constitute the warm-up chamber and the main cooling core for the cooling device 6.

When the oil cooling device, with the associated valve housing, is ready, the assembly of the device is as follows:

The valve-seat partitions 10, 11, 12, and 13, after appropriate machining, are welded or brazed in the sleeve 9. The check valve member 17 is first placed on the valve stem 77 up against the shoulder 70. Thereupon the piston 61 is slipped onto the stem section 77 after which the spring 63 is placed in position and the valve member 15 slipped onto the valve stem section 77. These parts are secured in place by the nut 62, after which the bushing 55 is placed on the end of the valve stem section.

These partially assembled parts are then placed in position within the sleeve 9 as they are shown in Fig. 3. The valve seat ring 53 is then secured in place by means of the spring ring 54. The valve member 16 is then slipped onto the valve stem section 78 up against the shoulder 65 following which the spring 66 is arranged between the valve member 16 and the flange 67 on the collar 68, screwed onto the end of the valve stem section 78. The auxiliary valve member 18 next has the spider 73 placed over the end of the collar 68 in position against the flange 67 by the spring ring 74. This sub-assembly of parts on the valve stem section 78 is then inserted into the end of the sleeve 9 so that the slot 76 will receive the pin 75 and the end of the valve stem section 78 enters the end of the section 77.

When these parts are assembled in the sleeve 9 the sleeve is inserted into the valve housing 7 and secured in proper angular position by means of the pin 45. Thereupon the thermostat 20 has the stem 80 slipped into the collar 68 and the collar 82 is slipped over the end of the stem 81, following which the end cap 30 is placed over the end of the sleeve 32 and locked in position in the end of the valve housing 7 by means of the spring ring 33. Next the valve member 14 is placed in position upon the bushing 55. The spring 58 is then arranged on the valve member 14, in the position shown in Fig. 3, whereupon the end cap 29 is slipped into place and locked by means of the spring ring 33.

Fittings 89 and 90, of a suitable character, are secured to the valve housing 7 whereby the housing main inlet and outlet ports 21 and 22 respectively may be connected into the lubricating oil line after the cooling device 6 has been properly secured in place on the aircraft.

The operation of the valve mechanism is, briefly, as follows:

Assume that the oil in the cooling core of the cooling device 6 is so congealed that it would be unsafe to have the pressure of the oil line applied thereto. Such a temperature of the oil would of necessity actuate the thermostat 20 so that the valve members 14, 15, 16, 17, and 18 would occupy the positions shown in Fig. 3. Thus communication between the housing main inlet port 21 and main outlet port 22 would be direct through the sleeve from the chamber 36 through the chambers 37, 38, and 39.

It will be noted that when the valve stem 19 is so retracted the auxiliary valve member 17 is seated on the valve seat 51. This closes the sleeve port 42. Likewise the auxiliary valve member 18 is shifted so that the ports 44 are not open to the housing auxiliary ports 28. It is, therefore, impossible for the oil line pressure, applied to moving the oil through the sleeve, to exercise any back pressure through the ports 42 and 28 on either the warm-up chamber tubes 86 or the main cooling core.

As soon as the travel of the oil through this path has become sufficiently warm to make it safe for the line pressure to be applied to the warm-up chamber, comprising tubes 86, the thermostat 20 will have shifted the valve stem 19 to the right of Fig. 3 sufficient to seat the valve member 15 but unseat the valve member 14. Thereupon the path of the oil from the housing main inlet port 21 to the main outlet port 22 would be indirect through the warm-up chamber of the cooling device.

Such movement of the valve stem 19 retracts the check valve member 17 thereby opening the port 42 and permitting the exit of oil from the warm-up chamber through the housing auxiliary inlet port 27, through the port 42, into the chamber 38, thence to the chamber 39, and out through the sleeve outlet port 43. Such movement of the stem 19 also shifts the auxiliary member 18 to begin to open up communication through the sleeve ports 44. Obviously the seating of the valve member 15 on the valve seat 49 precludes any oil flow between the sleeve chambers 36 and 37. However, in the event the condition of the oil in the warm-up chamber should make it unsafe for the oil line pressure to be applied to the oil in the warm-up chamber the spring 63 will yield so as to permit an escape of oil through the opening in the valve-seat partition 11 until such time as the condition of the oil in the warm-up chamber makes it safe to apply the line pressure to the movement of the oil therethrough.

As the temperature of the oil rises further the thermostat 20 acts to continue the movement of the valve stem to the right of Fig. 3 until the bell-shaped valve member 16 is seated on the valve seat 50. This closes communication between the chambers 38 and 39 so that the oil can no longer pass through the housing auxiliary port 27. This backing up of the oil in the warm-up chamber tubes 68 causes the oil to flow out through the ports 88 in the header 87 (see Fig. 1) from whence it passes through the main core section, through the housing auxiliary inlet ports 28 communicating with the registering sleeve ports 44 and the auxiliary valve ports 71 and out through the port 43 to the housing main outlet port 22.

Variations and modifications in the details of struiture and arrangement of the parts may be resorted to within the spirit and coverage of the appended claims.

I claim:

1. A fluid temperature-regulating valve mechanism comprising, a housing adapted for attachment to a heat-exchange unit having dual fluid flow paths, said housing having a main fluid inlet and a main fluid outlet, said housing also having an auxiliary fluid outlet for communication with a common inlet to the dual fluid flow paths in said heat-exchange unit and auxiliary inlets for communication with the fluid outlets for the dual fluid flow paths of said heat-exchange unit, said housing being divided interiorly by transverse partitions into a plurality of chambers which communicate radially of said housing, one with said housing main inlet, another with said housing auxiliary outlet, and two others respectively with the housing auxiliary inlets, said partitions having openings formed therein affording communication axially of said housing between the chambers on opposite sides of a respective partition, poppet valve mechanism movable axially of said housing and co-acting with valve seats on certain of said partitions opening to control the flow of fluid between said housing main inlet and said housing main outlet either directly through said partition openings or indirectly through said heat-exchange unit, a thermostat connected to actuate said valve mechanism and mounted in said housing for exposure to the fluid flow through said housing main outlet in advance of the discharge of the fluid therefrom whereby the temperature of the fluid determines the flow path thereof through said housing, and slide valve members co-acting with said housing for controlling communication through said housing auxiliary inlets, said slide valve member being connected to said thermostat so that the actuation of said slide valve member is synchronized with the actuation of said poppet valve mechanism whereby the closing and opening of said housing auxiliary inlets occurs simultaneously with the opening and closing respectively of communication between said housing main inlet and outlet directly through said housing.

2. A fluid temperature-regulating valve mechanism comprising, a housing adapted for attachment to a heat-exchange unit having dual fluid flow paths, said housing having a main fluid inlet and a main fluid outlet, said housing also having an auxiliary fluid outlet for communication with a common inlet to the dual fluid flow paths in said heat-exchange unit and auxiliary inlets for communication with the fluid outlets for the dual fluid flow paths of said heat-exchange unit, said housing being divided interiorly by transverse partitions into a plurality of chambers which communicate radially of said housing, one with said housing main inlet, another with said housing auxiliary outlet, and two others respectively with the housing auxiliary inlets, said partitions having openings formed therein affording communication axially of said housing between the chambers on opposite sides of a respective partition, poppet valve mechanism movable axially of said housing and co-acting with valve seats on certain of said partitions to control the flow of fluid between said housing main inlet and said housing main outlet either directly through said partition openings or indirectly through said heat-exchange unit, a thermostat connected to actuate said valve mechanism and mounted in said housing for exposure to the fluid flow through said housing main outlet in advance of the discharge of the fluid therefrom whereby the temperature of the fluid determines the flow path thereof through said housing, and a pair of axially slidable valve members contacting the walls of said housing in the respective chambers and adapted to control such communication therewith through said housing auxiliary inlets, said slidable valve members being mounted to move with said poppet valve mechanism whereby the closing and opening of said housing auxiliary inlet is synchronized with the opening and closing respectively of communication between said housing main inlet and outlet directly through said housing.

3. A fluid temperature-regulating valve mechanism comprising, a housing adapted for attachment to a heat-exchange unit having dual fluid flow paths, said housing having a main fluid inlet and a main fluid outlet, said housing also having an auxiliary fluid outlet for communication with a common inlet to the dual fluid flow paths in said heat-exchange unit and auxiliary inlets for communication with the fluid outlets for the dual fluid flow paths of said heat-exchange unit, said housing being divided interiorly by transverse partitions into a plurality of chambers which communicate radially of said housing, one with said housing main inlet, another with said housing auxiliary outlet, and two others respectively with the housing auxiliary inlets, said partitions having openings formed therein affording communication axially of said housing between the chambers on opposite sides of a respective partition, a thermostat mounted in the chamber communicating directly with said housing main outlet, a valve stem extending axially through said chambers to the chamber communicating directly with said housing auxiliary outlet, poppet valve members mounted on said stem and co-acting with valve seats on certain of said partitions to control the flow of fluid between said housing main inlet and said housing main outlet either directly through said housing or indirectly through said heat-exchange unit, cylindrical valve members mounted on said valve stem and having fluid-tight sliding engagement with the walls of the chambers which respectively communicate with said housing auxiliary inlets, the mounting of said cylindrical valve members on said stem relative to said first-mentioned valves being such that the closing and opening of communication between said two other chambers and the respective housing inlets is synchronized with the opening and closing respectively of communication between said housing main inlet and outlet directly through said housing.

4. A valve mechanism of the class described comprising, an open-ended housing having formed therein main inlet and outlet ports and auxiliary outlet and inlet ports, an end cap removably seated in each end of said housing, a sleeve supported in said housing and having ports formed therein affording communication between said housing ports and the interior of said sleeve, transverse valve-seat partitions bonded within said sleeve adjacent to said sleeve ports to form a plurality of chambers communicating through said sleeve ports with said housing ports and communicating with each other axially of said sleeve through openings in said partitions, thermostatic means supported in one of said chambers, a valve stem connected to said thermostatic means and extending axially through said chambers, a poppet valve member for each of said valve seats mounted on said valve stem and movable therewith whereby said valve members selectively open and close communication axially of said housing between said chambers and said housing ports as said stem is axially actuated by said thermostatic means, and slide valve members controlling the sleeve ports affording communication between said housing auxiliary inlet ports and the interior of said sleeve, said slide valve members being connected to said valve stem for actuation by said thermostat whereby the closing and opening of said sleeve ports communicating with said housing auxiliary inlet ports is synchronized with the opening and closing respectively of communication between said housing inlet and outlet directly through said housing.

JOE C. SHAW.

REFERENCES CITED

The following references are of record in the file of this patent:

UNITED STATES PATENTS

| Number | Name | Date |
|---|---|---|
| 2,374,639 | Miller | Apr. 24, 1945 |
| 2,379,109 | Shaw | June 26, 1945 |
| 2,396,053 | McEntire | Mar. 5, 1946 |

FOREIGN PATENTS

| Number | Country | Date |
|---|---|---|
| 553,892 | Great Britain | June 9, 1943 |